March 8, 1960 D. FIRTH 2,927,810
HUB MOUNTING UNIT
Filed March 7, 1958
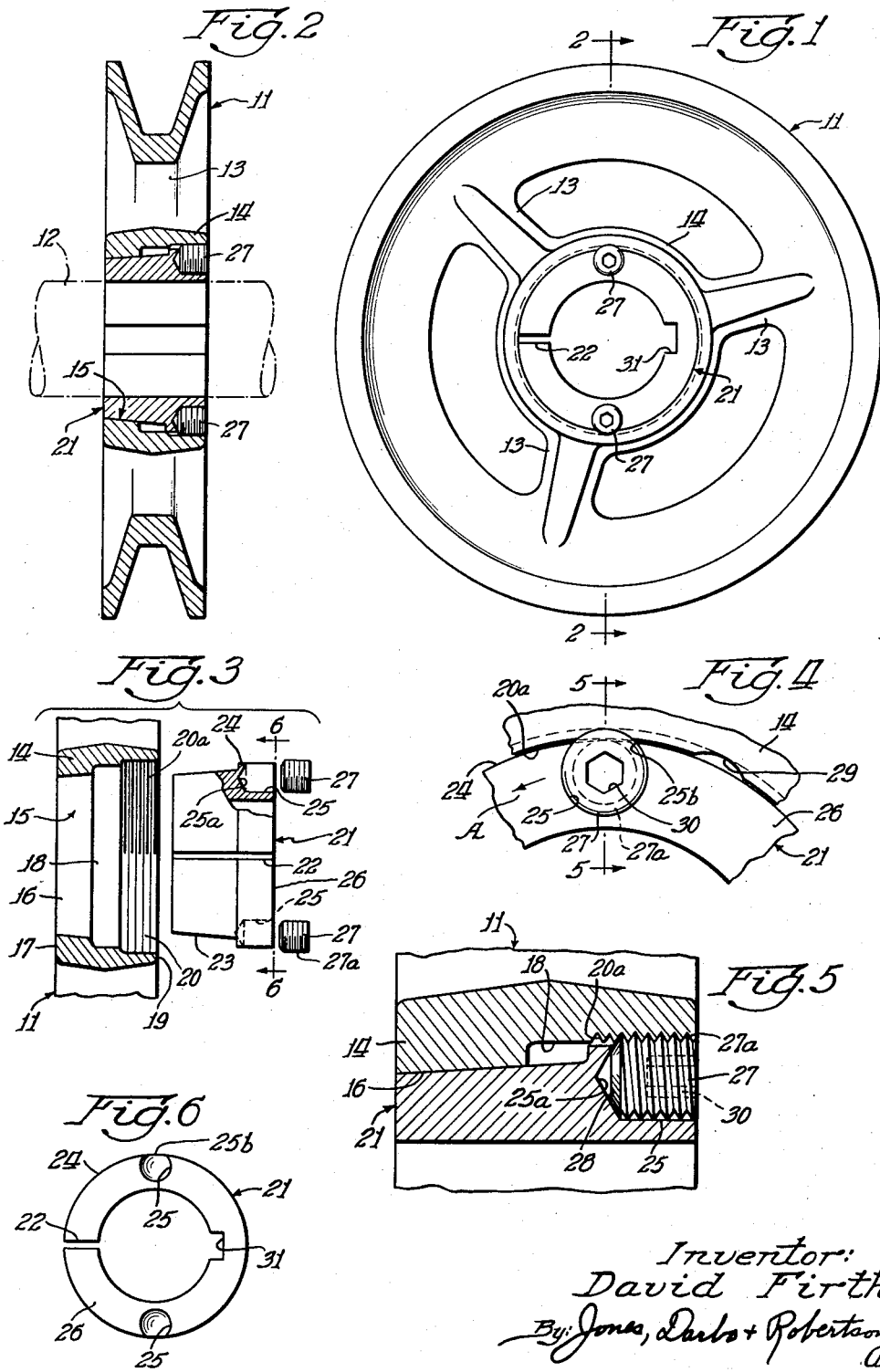
Inventor:
David Firth
By: Jones, Darby + Robertson
Attys.

United States Patent Office 2,927,810
Patented Mar. 8, 1960

2,927,810

HUB MOUNTING UNIT

David Firth, South Bend, Ind., assignor to Dodge Manufacturing Corporation, Mishawaka, Ind., a corporation of Indiana Application March 7, 1958, Serial No. 719,913

2 Claims. (Cl. 287—52)

This invention relates to hub mounting unit more particularly for the mounting on shafts of sheaves or pulleys or other machine elements and particularly to mountings of this type utilizing a tapered longitudinally split contractible hub sleeve or bushing and a plurality of screws parallel with the hub axis for effecting wedging of such sleeve or bushing between the hub of the sheave or other element and the shaft on which it is mounted.

An object of the invention is to provide an improved mounting of this type whereby to obtain, with the usual advantages thereof, substantial additional advantages in reduction of cost of manufacture and facility of application to the shaft. In my prior Patent No. 2,402,743 of June 25, 1946, I disclosed a mounting of this type including a hub which required two operations, first for the machining of the parts, and, second, for the drilling of the screw holes. By means of the present invention the hub can be initially fully machined without removing for a second operation of drilling, thus effecting a substantial reduction in cost. Similarly, the bushing can be completely finished in the lathe and the pockets drilled afterwards with no subsequent operation of turning the outside diameter of the bushing. Furthermore, in the installation of the hub mounting of my said prior patent, it was necessary to align the pockets in the bushing with the screw holes in the hub, whereas, by means of the present invention, the bushing may advantageously be located in any rotative position with respect to the hub, thus facilitating the assembly.

Other objects and advantages will be apparent from the following description, taken together with the accompanying drawing, showing an illustrative embodiment of the invention, and in which drawings—

Figure 1 is a face view of the hub mounting embodying the present invention;

Figure 2 is an axial section of the structure of Fig. 1 taken on the line 2—2 thereof, a portion of a shaft to which the unit is applied being shown in broken lines;

Figure 3 is a fragmentary view of the hub shown in Fig. 2 with the bushing and screws separated therefrom as in prior to assembly;

Figure 4 is an enlarged fragmentary segmental view somewhat similar to Fig. 1 but showing more detail;

Figure 5 is a cross-section taken on the line 5—5 of Fig. 4; and

Figure 6 is an end elevational view of the bushing itself, and being a view on the line 6—6 of Fig. 3.

Referring in detail to the illustrative construction shown in the drawings, the sheave 11 represents a machine element mounted on a shaft such as 12, the rim of the sheave being here shown of conventional form for use in a V-belt drive. The sheave 11 has spokes 13 and a hub proper 14.

In accordance with the present invention, and as best seen in Fig. 3, the hub 14 has a bore indicated generally by the numeral 15, which has three sections or portions, first, the tapered section 16 at one end thereof, that tapers to its smallest diameter at the rear face 17 of the hub. Next, the bore has the larger cylindrical portion 18 intermediately thereof. Then, opening into the opposite or front face 19 of the hub, the bore 15 has the tapped or internally threaded portion 20, continuously threaded therearound.

Further, in accordance with the present invention, for reception in the bore 15 of the hub 14 there is provided the contractible split bushing 21 that has the split 22 therein and has a periphery having two axially adjacent sections or portions, first, the tapered portion 23 and, second, a larger, in this instance cylindrical section 24. The tapered section 23 tapers decreasingly from the larger cylindrical section 24 on a taper of an angle corresponding to the angle of the tapered section 16 of the hub bore 15. In the cylindrical section 24 of the bushing are a plurality of pockets 25, two such pockets being here shown. The axes of the pockets 25 are parallel with the axis of the bushing and of the bore 15. The pockets 25 are plain pockets, that is, unthreaded, and have ends or bottoms 25a. The pockets are parti-cylindrical in the sense that they open into the periphery of the cylindrical enlarged portion 24 of the bushing as at 25b adjacent the face 26 of the bushing which is the face opposite its tapered portion 23.

Still following the present invention, the pockets 25 in the bushing are for the reception of threaded plugs or screws 27 that fit loosely in the pockets but are of a diameter such that the screw periphery projects radially through the opening 25b of the pocket. The screws 27 are preferably headless in this instance and are adapted to abut at their inner ends the bottoms 25a of the pocket 25 respectively, the screw being desirably slightly beveled as at 28 at this end to correspond to a somewhat similar conical formation for the pocket bottom 25a as best shown in Fig. 5.

Upon assembly of the bushing 21 with the hub 14, the bushing is inserted from the face 19 of the hub, with the tapered sections of both hub and bushing in contact, as clearly seen in Figs. 2 and 5. The screws 27 are then inserted in the pockets 25. Since at this time the pockets confront the continuously threaded portion 20 of the hub bore 15, the screws can only be inserted in the pockets by screwing them thereinto in engagement with the threads 20a. Since the screws 27 are headless, they go into the pockets without interference except by the hub bore threads 20a.

The hub internal thread 20a can be of any pitch so long as it is of the same pitch as the threads 27a of the screws 27.

When now the screws 27 are inserted into the pockets 25 with their peripheries respectively in engagement with the threads 20a of the hub bore, a screw will move inwardly of the bushing and hub bore, moving thereinto by the camming action of the mating threads, until the screw engages the bottom 25a of the pocket. Thereafter, further inward screwing movement of the screw forces the bushing toward the left in Fig. 2 with respect to the hub bore and moving a portion of the bushing of increasing taper into the taper 16 of the bore, thereby wedging the bushing in the bore and contracting it at its split 22. Thus the bushing is tightly gripped by the hub while the bushing tightly grips the shaft and thus rigidly mounting the sheave 11 on the shaft for rotation therewith. In the action just described the bottoms 25a of the pockets act as reaction elements or thrust shoulders cooperating with the screws to cause the wedging movement referred to.

It will be apparent that the arc of the hub bore threads 20a is of a larger radius than that of the threads 27a of the screws, but, so long as the pitch of the two threads is the same, the threading action occurs without the necessity of providing any predetermined angular position for the bushing in the hub bore. Consequently, the bushing may be placed anywhere in the bore, rotatively speaking, thus facilitating assembly of the parts for effecting the mounting, and minimizing the time of the mechanic in making the assembly.

To guard against stripping of the threads of the bore, the screws can be made longer or the bore threads coarser. Should stripping of the bore threads occur, as indicated for example at 29 (Fig. 4), the bushing may be loosened, the screws 27 removed, and the sheave 11 rotated relatively to the bushing (as indicated by arrow A) so as to present a new surface of hub threads 20a to the screws, thereby providing new threads for the screws to work on.

It will be observed that the intermediate portion 18 of the hub bore, which is cylindrical, is just sufficiently larger than the cylindrical portion 24 of the bushing to accommodate the latter before the screws reach the inner end of the hub threads so as to permit relative axial movement of the bushing with respect to the hub as already described.

The screws 27, advantageously headless as already referred to, may have the non-circular sockets 30 therein in their outer ends to receive the usual non-circular wrench head to effect rotation of the screw.

If desired, the bushing 21 may be keyed to the shaft as by a key and keyway in the shaft (not shown) and a keyway 31, in the interior of the bushing, to receive such key.

As the bushing is contracted, as described, a slight constriction of the side walls of the keyway 31 will also occur, which causes the key to be gripped to prevent it from sliding out of the keyway, thus eliminating the need for a set-screw therefor.

So constructed and arranged, an improved hub mounting unit is provided having enhanced simplicity of manufacture and marked facility of installation.

The term "hub" as used herein may denote the hub of a machine element or of a sheave mounted on a shaft or such element as a whole having a tapered hub bore.

Such changes including modifications or additions may be made as fall within the scope of the appended claims without departing from the invention.

The invention having been described, what is here claimed is:

1. A hub mounting unit, comprising, a hub having a bore for receiving a bushing, said bore being tapered at one end and at its other end being internally continuously threaded therearound, a split contractible bushing entered into said bore from its threaded end and having a larger section and a reduced tapered section snugly entering the tapered end of the bore, said bushing being formed with bottomed parti-cylindrical unthreaded pockets in the periphery of its larger section parallel to its axis, and screws in said pockets engaging said bore threads, the bottoms of the pockets providing shoulders constituting reaction elements for the screws, whereby turning said screws inwardly forces the tapered bushing section into the tapered hub bore to contract the bushing.

2. A hub mounting unit, comprising, a hub having a bore for receiving a bushing, said bore being tapered at one end and at its other end being internally continuously threaded therearound, a split contractible bushing entered into said bore from its threaded end having a relatively larger cylindrical section and a reduced tapered section snugly entering the tapered end of the bore, said bushing being formed with bottomed parti-cylindrical diametrically spaced apart unthreaded pockets in the periphery of its larger section parallel to its axis, and screws in said pockets engaging said bore thread, the bottoms of the pockets providing shoulders constituting reaction elements for the screws, whereby turning said screws inwardly forces the tapered bushing section into the tapered hub bore to contract the bushing, said hub bore being enlarged intermediately of its said ends to accommodate the larger section of the bushing between the tapered end of the bore and its threaded end.

References Cited in the file of this patent

UNITED STATES PATENTS

| 738,445 | Hoffmann | Sept. 8, 1903 |
| 2,402,743 | Firth | June 25, 1946 |
| 2,509,711 | Williams | May 30, 1950 |